(12) United States Patent
Nibe (10) Patent No.: US 8,483,075 B2
(45) Date of Patent: Jul. 9, 2013

(54) COMMUNICATION METHOD AND COMMUNICATION APPARATUS

(75) Inventor: Keiji Nibe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1154 days.

(21) Appl. No.: 12/402,722

(22) Filed: Mar. 12, 2009

(65) Prior Publication Data

US 2009/0241003 A1 Sep. 24, 2009

(30) Foreign Application Priority Data

Mar. 18, 2008 (JP) ................... 2008-069986

(51) Int. Cl.
*G08C 15/00* (2006.01)
(52) U.S. Cl.
USPC .......................................... 370/252; 370/336
(58) Field of Classification Search
USPC ................. 370/241, 252, 276, 277, 278, 310, 370/315, 316, 326, 328, 329, 331, 332, 333, 370/335, 336, 342, 343, 464, 465, 473; 455/403, 455/422.1, 436, 441, 39, 500, 501, 504
See application file for complete search history.

(56) References Cited

U.S. PATENT DOCUMENTS

| | | | |
|---|---|---|---|
| 2005/0276317 A1* | 12/2005 | Jeong et al. | 375/213 |
| 2007/0129096 A1* | 6/2007 | Okumura et al. | 455/522 |
| 2007/0147289 A1 | 6/2007 | Nibe | |
| 2007/0149149 A1 | 6/2007 | Nibe | |
| 2007/0217531 A1* | 9/2007 | Kwon et al. | 375/260 |
| 2008/0205555 A1* | 8/2008 | Zhu et al. | 375/340 |
| 2010/0157916 A1* | 6/2010 | Kim et al. | 370/329 |

FOREIGN PATENT DOCUMENTS

| | | |
|---|---|---|
| JP | 2007-180925 | 7/2007 |
| JP | 2007-180926 | 7/2007 |

\* cited by examiner

*Primary Examiner* — Obaidul Huq
(74) *Attorney, Agent, or Firm* — Myers Wolin, LLC (57) ABSTRACT

A communication method including receiving a common channel signal, transmitting information indicating a reception state based on data included in the received signal, determining whether or not the data included in the received signal is acquirable, measuring fading speed based on the received signal in the case where the data is determined not to be acquirable, estimating whether or not the data is determined to be acquirable by re-determination based on the measurement result, and adding specified signals before and after the information indicating the reception state when the estimating results in a determination that the data is acquirable by re-determination.

10 Claims, 10 Drawing Sheets

| THRESHOLD VALUE TABLE 133a | |
|---|---|
| SPEED | ESTIMATED VALUE |
| LESS THAN 10 KM/H | NG |
| 10 KM/H OR MORE | OK |

COMMUNICATION METHOD AND COMMUNICATION APPARATUS

CROSS-REFERENCE TO RELATED APPLICATION

This application is based upon and claims the benefit of priority of prior Japanese Patent Application No. 2008-69986, filed on Mar. 18, 2008, the entire contents of which are incorporated herein by reference.

FIELD

Embodiments of the present invention relate to a communication method and a communication apparatus. The communication method and the communication apparatus include a technique for transmitting information indicating a reception state of data.

BACKGROUND

Recently, a communication system adopting Code Division Multiple Access (CDMA) as a multiple access method is operated in the field of a mobile communication system. Improvements are given by High Speed Downlink Packet Access (HSDPA) for speeding up a communication (downlink communication) from a radio base station to a mobile station. Such a mobile communication system adopts a retransmission control method called Hybrid Automatic Repeat reQuest (HARQ). In the HARQ, when detecting an error in data received from the radio base station, the mobile station performs a retransmission request to the radio base station, while holding the data that includes the error. When receiving the retransmitted data from the radio base station, the mobile station performs decoding processing by combining the held data that was previously received and the retransmitted data. This makes it possible to improve the benefit of the decoding processing. Thus, the number of retransmissions may be reduced.

In such a system the mobile station returns an ACKnowledgement (ACK) to the radio base station when no error is detected by error detection processing. The mobile station returns a Negative ACKnowledgement (NACK) when an error is detected. If the data detection ever fails (for example, if control information necessary for data decoding is not acquirable), the mobile station returns a Discontinuous Transmission (DTX) indicating that no data has been received (or detected). The radio base station may change the content of the retransmission depending on whether the response from the mobile station is a NACK or a DTX. For example, if the response is a DTX, the previously transmitted data is retransmitted as it is. If the response is a NACK, it is considered that only a necessary part of the previous transmission data is retransmitted. As a result, it is possible to further improve efficiency of retransmitting processing.

As signal expressions of ACK/NACK/DTX, it is considered that the ACK corresponds to a signal "1", the NACK corresponds to a signal "0", and the DTX corresponds to a signal "NULL" (signal of level 0). However, by utilizing only these signals for ACK/NACK/DTX, it is difficult to distinguish between ACK/NACK and DTX in the radio base station when the mobile station is strongly affected by noises. Therefore, when the mobile station transmits an ACK/NACK to the radio base station, there is a method for transmitting a given PRE signal and a POST signal together before and after the ACK/NACK. The radio base station may accurately distinguish between the ACK/NACK and the DTX by comparing the levels of the PRE signal and the POST signal and the level of the ACK/NACK signal which is between those two signals (for example, see 3rd Generation Partnership Project, "Physical layer procedures (FDD)", 3GPP TS25.214, 2007-05, V7.5.0.)

Meanwhile, if the mobile station does not acquire control information and fails to detect the data, a method is considered in which re-acquisition of the control information is attempted, instead of requesting retransmission, by transmitting the DTX immediately to the radio base station. This is because that, when the control information is acquired from a common control channel of the downlink, it is considered that demodulation and decoding of the received signal may not be performed successfully because of failure of channel estimation.

That is, the channel estimation of the common control channel at a time of a certain time slot #n is performed based on the received signal to the time slot #n−1 at first. Thus, the accuracy of the channel estimation may not be very good. Meanwhile, if channel estimation processing is delayed by one time slot, it is possible to estimate the common control channel at the time of the time slot #n based on the received signal to the time slot #n. Thus, the estimation accuracy is expected to increase. Accordingly, the control information may be acquired successfully by performing re-demodulation and re-decoding of the signal of the common control channel. By this method, it is possible to reduce the number of times of retransmission from the radio base station to the mobile station (see, for example, Japanese Laid-Open Patent Publication 2007-180925).

The data acquisition from the received signal fails and then re-acquisition is attempted. As a result, if the data acquisition is successful, response information (ACK or NACK) to the acquired data is transmitted. At this time, it is preferable to add the given signals (a PRE signal and a POST signal) before and after the response information.

However, as a method for adding the given signals after receiving success of the data re-acquisition, there is a problem that signal (PRE information) transmission before the response information is too late because of processing delay accompanied with the data re-acquisition. This is because the usually permissible time from reception of the data to transmission of the response information is determined according to communication standards. If the signal (PRE signal) before the response information is missing because the transmission before the response information is too late, recognition accuracy of the response information at the receiving side is lowered, and then the efficiency of retransmission control is inhibited.

SUMMARY

According to an aspect of the embodiments, a communication method including receiving a common channel signal, transmitting information indicating a reception state based on data included in the received signal, determining whether or not the data included in the received signal is acquirable, measuring fading speed based on the received signal in the case where the data is determined not to be acquirable, estimating whether or not the data is determined to be acquirable by re-determination based on the measurement result, and adding specified signals before and after the information indicating the reception state when the estimating determines that the data is acquirable by re-determination.

According to another aspect of the embodiments, a communication apparatus including a receiving unit configured to receive a common channel signal, a transmitting unit configured to transmit information indicating a reception state based on data included in the received signal, a determination unit that determines whether or not the data included in the received signal is acquirable, a measurement unit configured to measure fading speed based on the received signal, and an addition unit configured to add specified signals before and after the information indicating the reception state when the estimating determines that the data is acquirable by re-determination in the case where the data is determined to be not acquirable by the determination unit.

Additional objects and advantages of the embodiments will be set forth in part in the description which follows, and in part will be obvious from the description, or may be learned by practice of the embodiments. The object and advantages of the embodiments will be realized and attained by means of the elements and combinations particularly pointed out in the appended claims.

It is to be understood that both the foregoing summary description and the following detailed description are exemplary and explanatory and are not restrictive of the embodiment, as claimed.

BRIEF DESCRIPTION OF THE DRAWINGS

Embodiments are illustrated by way of example and not limited by the following figures.

DESCRIPTION OF EMBODIMENTS

Hereinafter, examples of embodiments of the disclosed communication method and communication apparatus will be described with reference to the drawings.

Figure 1:
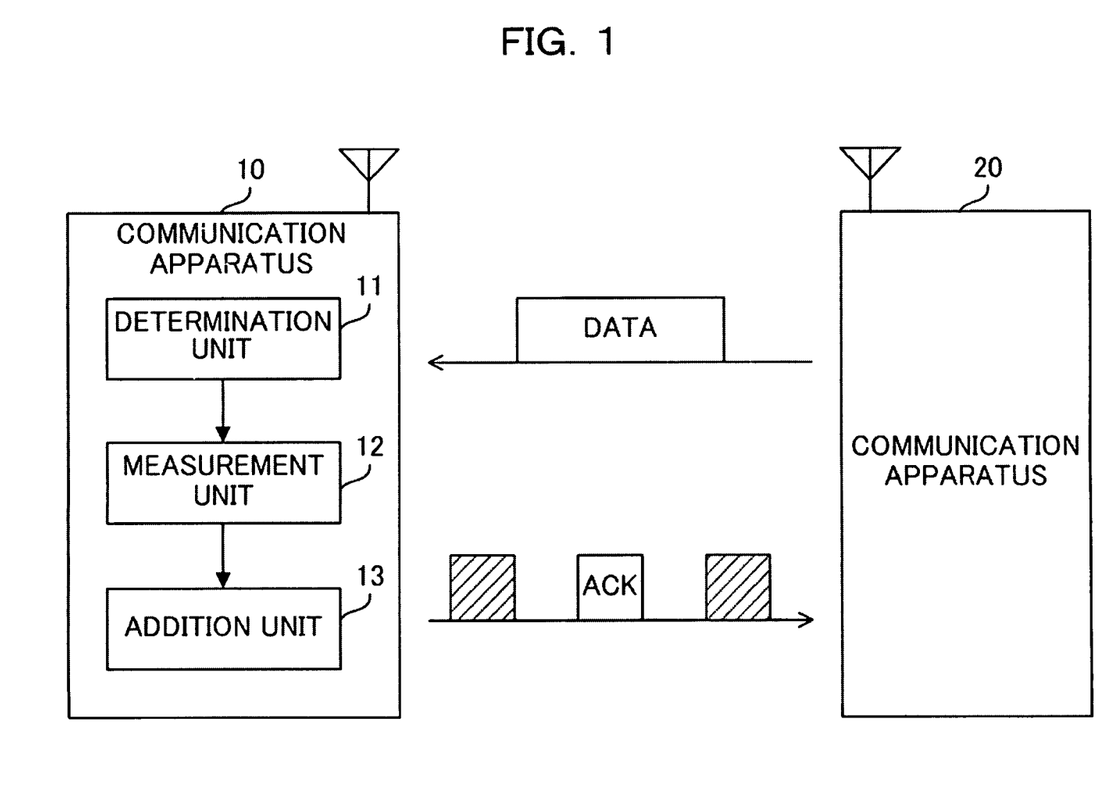
FIG. 1 illustrates an overview of the present embodiment.

FIG. 1 illustrates an overview of an embodiment. A communication system shown in FIG. 1 has communication apparatuses 10 and 20. The communication apparatus 10 receives data from the communication apparatus 20 and transmits information indicating a reception state to the communication apparatus 20. The communication apparatus 10 is, for example, a mobile station capable of performing radio communication. The communication apparatus 20 transmits the data to the communication apparatus 10 and receives from the communication apparatus 10 the information indicating the reception state of the communication apparatus 10. The communication apparatus 20 may, for example, perform retransmission control of the data based on the information indicating the reception state received from the communication apparatus 10.

The communication apparatus 10 has a determination unit 11 and a measurement unit 12, and an addition unit 13. The determination unit 11 determines whether or not the data included in the received signal received from the communication apparatus 20 is acquirable. A case where the data is not acquirable is, for example, a case where the control information necessary for data decoding is not acquirable from the common control channel. The measurement unit 12 measures fading speed based on the signal received from the communication apparatus 20.

When the determination unit 11 determines that the data is not acquirable, the addition unit 13 estimates whether or not the data is determined to be acquirable by re-determination based on the measurement result of the measurement unit 12 before the re-determination is performed. For example, when the fading speed is more than a given threshold value, the addition unit 13 estimates that it is determined that the data is acquirable. When the addition unit 13 estimates that it is determined that the data is acquirable, the addition unit 13 adds specified signals before and after the information indicating the reception state to be transmitted to the communication apparatus 20. On the other hand, if the addition unit 13 estimates that it is determined that the data is not acquirable, the addition unit 13 does not add the specified signals.

As the information indicating the reception state, for example, the ACK/NACK indicating whether or not the acquired data includes an error, and the DTX indicating that data is not acquirable are considered. In this case, the communication apparatus 10 adds the specified signals before and after the ACK/NACK. On the other hand, the communication apparatus 10 does not add the specified signals to the DXT. However, when the data becomes acquirable by re-determination, the addition of the specified signals to the ACK/NACK may be too late because of the processing delay. Therefore, to perform the re-determination, the communication apparatus 10 estimates the determination result and then determines whether to add the specified signals before performing the re-determination.

According to such a communication system, the determination unit 11 of the communication apparatus 10 determines whether or not the data is acquirable. Furthermore, the measurement unit 12 of the communication apparatus 10 measures the fading speed based on the received signal from the communication apparatus 20. In the case where the determination unit 11 determines that the data is not acquirable, if the measurement unit 12 acquires a measurement result indicating that it is estimated that the data is acquirable by re-determination, the addition unit 13 adds the specified signals before and after the information indicating the reception state.

Accordingly, the communication apparatus 10 may transmit the specified signals with the information indicating the reception state at a proper timing even when the data is acquired by performing the re-determination of whether or not the data is acquirable. That is, it is possible to prevent the addition of the specified signals to the information indicating the reception state from being too late because of the delay accompanied with the re-determination. As a result, the communication apparatus 20 may accurately recognize the information indicating the reception state with reference to the specified signal.

Detailed description will be made below of specific content of an embodiment with reference to figures.

Figure 2:
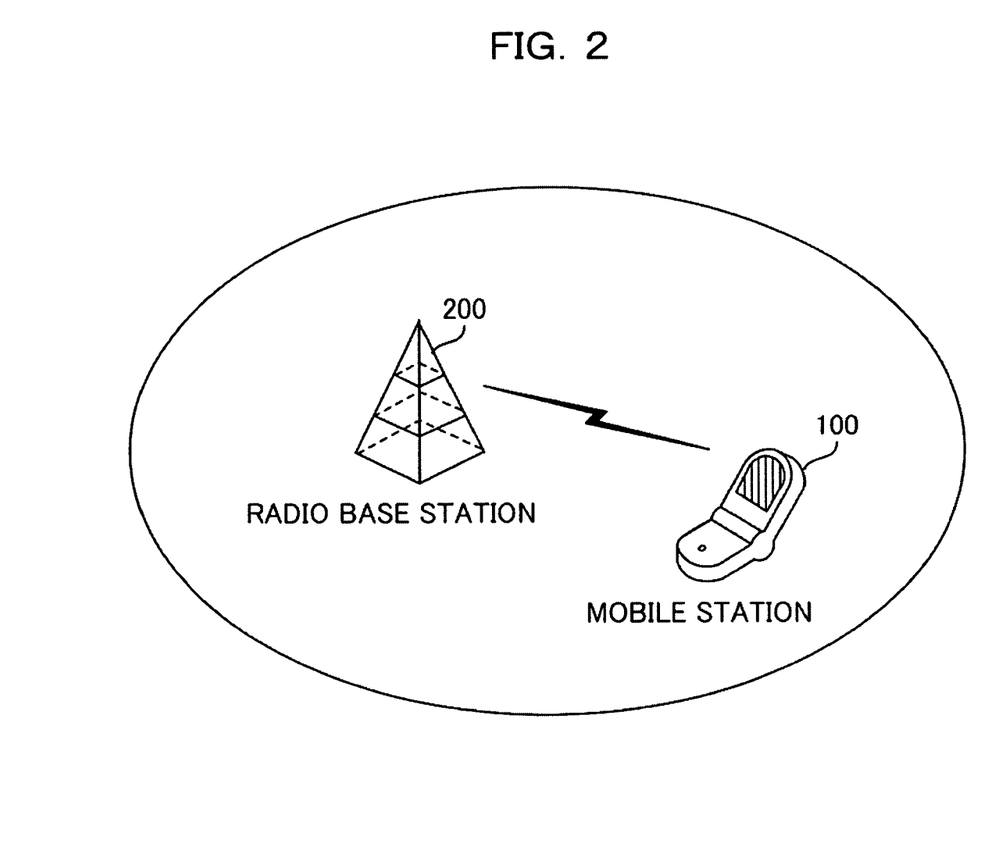
FIG. 2 illustrates a system configuration of the present embodiment.

FIG. 2 is a diagram illustrating a system configuration of an embodiment. The radio communication system illustrated in FIG. 2 is a mobile communication system that performs radio communication between the mobile station and the radio base station that is in a radio wave arrival range. This radio communication system has a mobile station 100 and a radio base station 200.

When the mobile station 100 has transmission data, the mobile station 100 transmits the data as a radio signal to the radio base station 200. Furthermore, the mobile station 100 receives a radio signal transmitted by the radio base station 200 and then detects the data, addressed to itself, included in the received signal. The radio base station 200 receives the radio signal transmitted by the mobile station 100 and then detects the data. Furthermore, when the radio base station 200 has data addressed to the mobile station 100, the radio base station 200 transmits the data as a radio signal.

The present embodiment considers the CDMA communication system adopting the HSDPA method for controlling downlink communication. That is, the communication channel used for the downlink communication from the radio base station 200 to the mobile station 100 includes Common PIlot CHannel (CPICH), Primary-Common Control Physical CHannel (P-CCPCH), High Speed-Shared Control CHannel (HS-SCCH), and High Speed-Physical Downlink Shared CHannel (HS-PDSCH). The communication channel used for uplink communication from the mobile station 100 to the radio base station 200 includes High Speed-Dedicated Physical Control CHannel (HS-DPCCH).

The CPICH is a common channel of the downlink and is used to transmit a pilot signal (a specified signal known between the mobile station 100 and the radio base station 200) used for channel estimation and cell search by the mobile station 100, and timing acquisition of other downlink communication channels or the like. The P-CCPCH is a common channel of the downlink and is used to transmit notification information that is notified to a cell by the radio base station 200.

The HS-SCCH is a common control channel of the downlink and is used to transmit various parameters for decoding the data transmitted by the HS-PDSCH. For example, a method for encoding data, the number of spread code allocation, a pattern of rate matching processing and the like are given as a parameter. The HS-PDSCH is a common control channel of the downlink and is used to transmit the data (control data) subjected to processing according to the parameter transmitted by the HS-SCCH.

The HS-DPCCH is a private control channel of the uplink and is used by the mobile station 100 to transmit an ACK/NACK/DTX signal according to the reception state of the data from the HS-PDSCH. The HS-DPCCH is also used to transmit a Channel Quality Indicator (CQI) indicating a measurement result of the radio communication quality of the downlink (for example, Signal to Interference Ratio (SIR)).

The mobile station 100 and the radio base station 200 adopt Code Division Multiple Access. The above-described communication channels included in the radio signal are separated from each other by a code.

Next, a module configuration of the mobile station 100 will be described. Due to limitations of space, the module configuration of the mobile station 100 is divided into FIG. 3 and FIG. 4.

Figure 3:
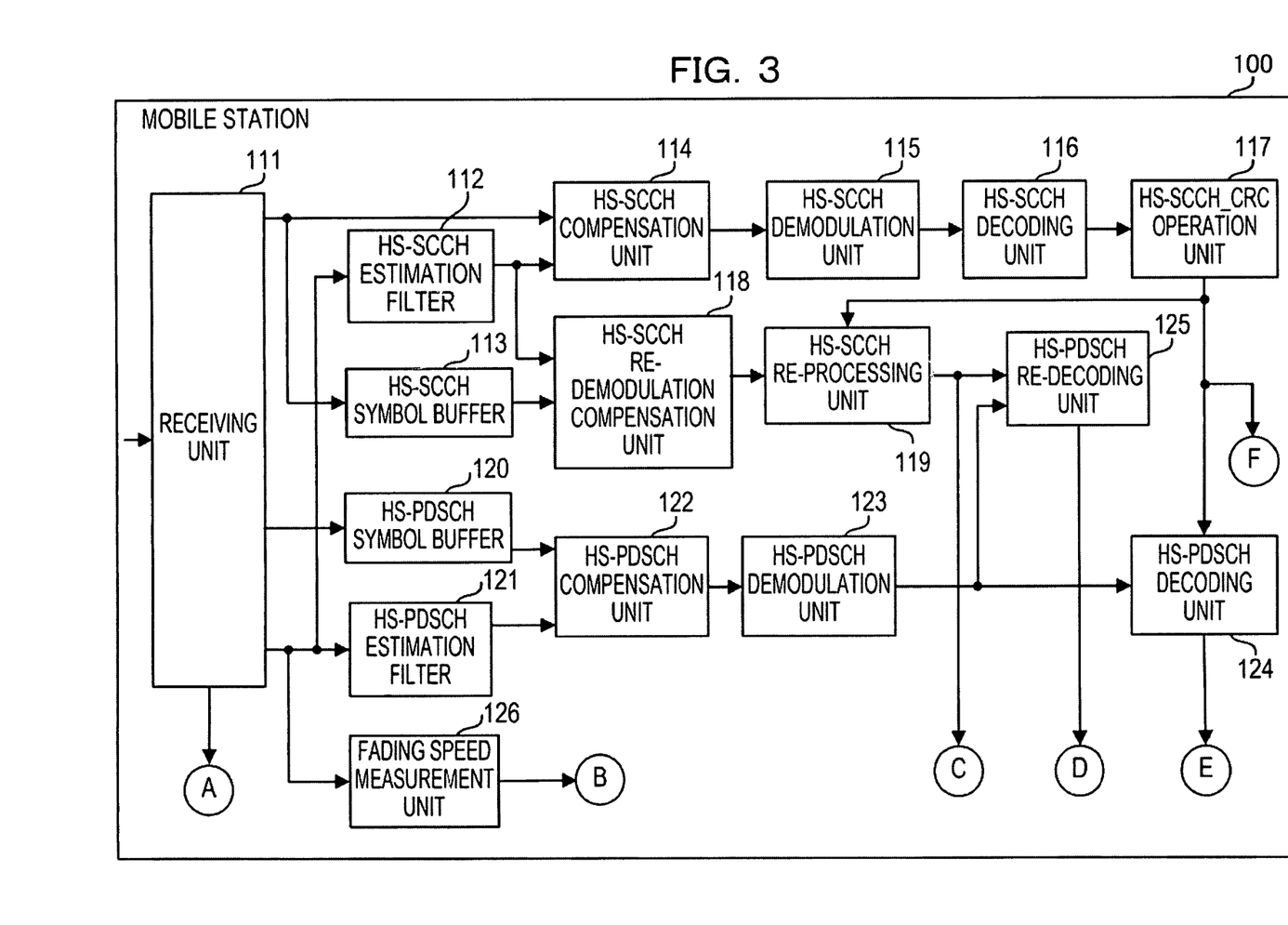
FIG. 3 is a first block diagram illustrating a function of a mobile station.

FIG. 3 is a first block diagram illustrating a function of the mobile station. The mobile station 100 has a receiving unit 111, an HS-SCCH estimation filter 112, an HS-SCCH symbol buffer 113, an HS-SCCH compensation unit 114, an HS-SCCH demodulation unit 115, an HS-SCCH decoding unit 116, an HS-SCCH_CRC operation unit 117, an HS-SCCH re-demodulation compensation unit 118, an HS-SCCH re-processing unit 119, an HS-PDSCH symbol buffer 120, an HS-PDSCH estimation filter 121, an HS-PDSCH compensation unit 122, an HS-PDSCH demodulation unit 123, an HS-PDSCH decoding unit 124, an HS-PDSCH re-decoding unit 125, and a fading speed measurement unit 126.

The receiving unit 111 acquires a reception signal from the radio base station 200 by a reception antenna (not shown) provided by the mobile station 100. Then the receiving unit 111 performs processing such as pass detection and reverse spread on the acquired reception signals, and then divides the signals into the downlink communication channels such as CPICH, HS-SCCH, HS-PDSCH and the like.

After that, the receiving unit 111 outputs the CPICH signal to the HS-SCCH estimation filter 112, the HS-PDSCH estimation filter 212, and the fading speed measurement unit 126. Furthermore, the receiving unit 111 outputs the HS-SCCH signal to the HS-SCCH symbol buffer 113 and the HS-SCCH compensation unit 114. Furthermore, the receiving unit 111 outputs the HS-PDSCH signal to the HS-PDSCH symbol buffer 120.

The HS-SCCH estimation filter 112 uses the specified signal of the CPICH acquired from the receiving unit 111 to find a channel estimation value to be used for channel compensation of the HS-SCCH. Then the HS-SCCH estimation filter 112 outputs the acquired channel estimation value to the HS-SCCH compensation unit 114 and the HS-SCCH re-demodulation compensation unit 118.

The HS-SCCH symbol buffer 113 is a buffer memory that temporarily holds the HS-SCCH signal acquired from the receiving unit 111 to prepare for the re-demodulation and re-decoding of the HS-SCCH signal. The HS-SCCH symbol buffer 113 is a buffer memory that temporarily holds the HS-SCCH signal acquired from the receiving unit 111 to prepare for the re-demodulation and re-decoding of the HS-SCCH signal. Then the HS-SCCH symbol buffer 113 outputs the HS-SCCH signal to the HS-SCCH re-modulation compensation unit 118 according to timing of the re-demodulation and re-decoding.

In response to the HS-SCCH signal acquired from the receiving unit 111, the HS-SCCH compensation unit 114 applies the channel estimation value acquired from the HS-SCCH estimation filter 112 to perform channel compensation. Then the HS-SCCH compensation unit 114 outputs the compensated HS-SCCH signal to the HS-SCCH demodulation unit 115.

The HS-SCCH demodulation unit 115 demodulates the compensated HS-SCCH signal acquired from the HS-SCCH compensation unit 114 according to a given demodulation method. The HS-SCCH demodulation unit 115 outputs the acquired HS-SCCH demodulated data to the HS-SCCH decoding unit 116.

The HS-SCCH decoding unit 116 decodes the HS-SCCH demodulated data acquired from the HS-SCCH demodulation unit 115 according to the given decoding method. Then the HS-SCCH decoding unit 116 outputs the acquired HS-SCCH decoded data to the HS-SCCH_CRC operation unit 117. The decoded data acquired at this time includes a check bit for a Cyclic Redundancy Check (CRC).

The HS-SCCH_CRC operation unit 117 performs CRC operation, that is, error detection processing on the HS-SCCH decoded data acquired from the HS-SCCH decoding unit 116. Then the HS-SCCH_CRC operation unit 117 outputs an error detection result (for example, the result "OK" indicating no error detected or the result "NG" indicating error detected) to the HS-SCCH re-processing unit 119 and a PRE/POST determination unit 133 that will be described below. Furthermore, if the error detection result is OK, the HS-SCCH_CRC operation unit 117 outputs the acquired HS-SCCH data to the HSPDSCH decoding unit 124.

The HS-SCCH re-demodulation compensation unit 118 acquires a delayed HS-SCCH signal from the HS-SCCH symbol buffer 113, and performs channel compensation by applying the channel estimation value acquired from the HS-SCCH estimation filter 112. That is, the HS-SCCH re-demodulation compensation unit 118 performs the channel compensation again by applying the latest channel estimation value on the HS-SCCH signal that is the same as the signal received for channel compensation in the HS-SCCH compensation unit 114. As a result, the HS-SCCH re-demodulation compensation unit 118 performs the channel compensation with higher accuracy than that of the HS-SCCH compensation unit 114. Then the HS-SCCH re-demodulation compensation unit 118 outputs the HS-SCCH signal to the HS-SCCH re-processing unit 119.

When acquiring the error detection result NG from the HS-SCCH_CRC operation unit 117, the HS-SCCH re-processing unit 119 performs demodulation, decoding, and CRC operation on the compensated HS-SCCH signal acquired from the HS-SCCH re-demodulation compensation unit 118. That is, the HS-SCCH re-processing unit 119 performs the same demodulation processing as that of the HS-SCCH demodulation unit 115, performs the same decoding processing as that of the HS-SCCH decoding unit 116, and performs the same error detecting processing as that of the HS-SCCH_CRC operation unit 117. Then the HS-SCCH re-processing unit 119 outputs the error detection result to a scheduling unit 134 that will be described below. If the error detection result is OK, the HS-SCCH re-processing unit 119 outputs the acquired HS-SCCH data to an HS-PDSCH re-decoding unit 125.

The HS-PDSCH symbol buffer 120 is a buffer memory that temporarily holds the HS-PDSCH signal acquired from the receiving unit 111. The HS-PDSCH symbol buffer 120 outputs the HS-PDSCH signal to the HS-PDSCH compensation unit 122 with the delay according to the timing of the demodulation and decoding.

The HS-PDSCH estimation filter 121 calculates the channel estimation value to be used for the channel compensation of the HS-PDSCH by using the specified signal of the CPICH signal acquired from the receiving unit 111. Then the HS-PDSCH estimation filter 121 outputs the acquired channel estimation value to the HS-PDSCH compensation unit 122.

The HS-PDSCH compensation unit 122 performs the channel compensation on the HS-PDSCH signal acquired from the HS-PDSCH symbol buffer 120 by applying the channel estimation value acquired from the HS-PDSCH estimation filter 121. Then the HS-PDSCH compensation unit 122 outputs the compensated HS-PDSCH signal to the HS-PDSCH demodulation unit 123.

The HS-PDSCH demodulation unit 123 demodulates the compensated HS-PDSCH signal acquired from the HS-PDSCH compensation unit 122. Then the HS-PDSCH demodulation unit 123 outputs the acquired HS-PDSCH demodulated data to the HS-PDSCH decoding unit 124 and the HS-PDSCH re-decoding unit 125.

When the HS-PDSCH decoding unit 124 acquires the HS-SCCH data (the error detection result is OK) that includes no error from the HS-SCCH_CRC operation unit 117, the HS-PDSCH decoding unit 124 decodes the HS-PDSCH demodulated data acquired from the HS-PDSCH demodulation unit 123. That is, the HS-PDSCH decoding unit 124 performs decoding processing based on various parameters such as an encoding method indicated by the HS-SCCH data. Then the HS-PDSCH decoding unit 124 outputs the acquired HS-PDSCH decoded data to an HARQ processing unit 130 that will be described below.

If the HS-PDSCH re-decoding unit 125 acquires the HS-SCCH data (the error detection result is OK) that includes no error from the HS-SCCH re-processing unit 119, the HS-PDSCH re-decoding unit 125 decodes the HS-PDSCH demodulated data acquired from the HS-PDSCH demodulation unit 123 in the same way as the HS-PDSCH decoding unit 124. Then the HS-PDSCH re-decoding unit 125 outputs the acquired HS-PDSCH decoded data to the HARQ processing unit 130 that will be described below.

The fading speed measurement unit 126 measures the fading speed (the moving speed of the mobile station 100) based on the CPICH signal acquired from the receiving unit 111. The fading speed may be measured based on, for example, a time change of the reception level of the CPICH signal. That is, the fading speed measurement unit 126 calculates the average value of reception level for a certain time period to find the number of times the reception level changes across the average level (the number of crossing times) when the reception level is viewed in a time series. By applying the number of crossing times to the following formula (1), the fading speed may be calculated approximately.

$$v = \frac{N_{max} c}{\sqrt{\pi} \, e^{-1/2} f} \qquad (1)$$

In this case, v means fading speed, N means the number of crossing times, c means light speed, and f means carrier frequency. For the detail of the formula (1), refer to "Basic of Mobile Communication" (edited by the Institute of Electronics, Information and Communication Engineers), written by OKUMURA, Shinji. In this manner, the fading speed measurement unit 126 calculates and outputs the fading speed to a PRE/POST determination unit 133 (FIG. 4).

Figure 4:
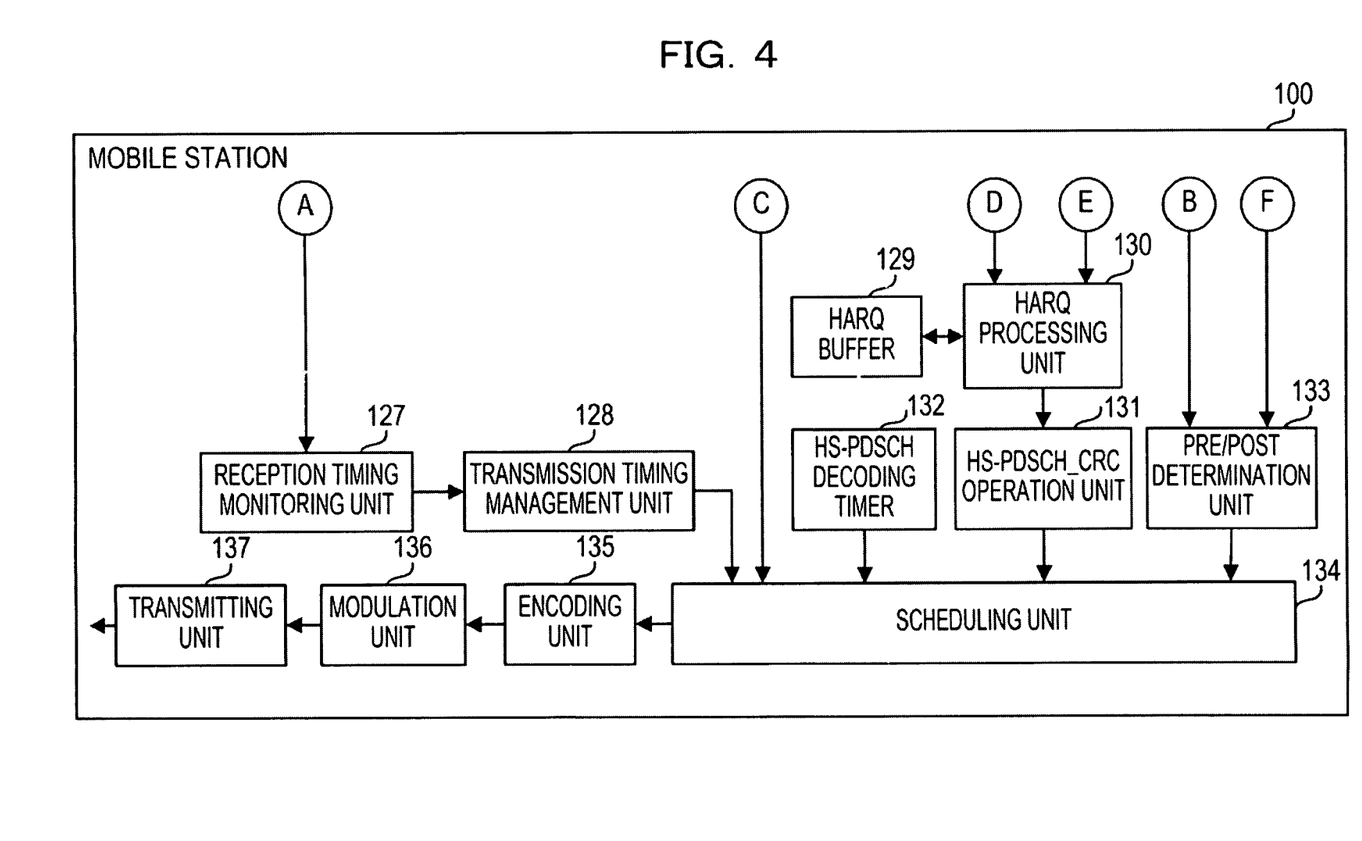
FIG. 4 is a second block diagram illustrating a function of the mobile station.

FIG. 4 is a second block diagram illustrating a function of a mobile station. In addition to the units shown in FIG. 3, the mobile station 100 has a reception timing monitoring unit 127, a transmission timing management unit 128, an HARQ buffer 129, an HARQ processing unit 130, an HS-PDSCH_CRC operation unit 131, an HS-PDSCH decoding timer 132, a PRE/POST determination unit 133, a scheduling unit 134, an encoding unit 135, a modulation unit 136, and a transmitting unit 137.

The reception timing monitoring unit 127 continuously monitors the reception timing of each downlink communication channel in the receiving unit 111, and determines the reception timing of the downlink signal such as start timing of a frame as a configuration unit of a radio signal. The reception timing monitoring unit 127 outputs a specific result to a transmission timing management unit 128.

The transmission timing management unit 128 manages the transmission timing of an uplink signal based on the reception timing of a downlink signal acquired from the reception timing monitoring unit 127. Specifically, the transmission timing management unit 128 manages the transmission timing of the ACK/NACK/DTX. Then the transmission timing management unit 128 instructs the transmission timing to the scheduling unit 134.

The HARQ buffer 129 is a buffer memory that temporarily holds the HS-PDSCH data acquired from the HS-PDSCH decoding unit 124 or the HS-PDSCH re-decoding unit 125 for re-transmission control by the HARQ. Storage and reading of the HS-PDSCH data with respect to the HARQ buffer 129 is performed by the HARQ processing unit 130.

The HARQ processing unit 130 performs HARQ composition on the HS-PDSCH data acquired from the HS-PDSCH decoding unit 124 or the HS-PDSCH re-decoding unit 125. That is, when acquiring new HS-PDSCH data, the HARQ processing unit 130 outputs the new HS-PDSCH data as it is to the HS-PDSCH_CRC operation unit 131 and stores the new HS-PDSCH data in the HARQ buffer 129. After that, when acquiring the retransmitted HS-PDSCH data, the HARQ processing unit 130 combines the retransmitted data and the previous data (the data that includes error) stored in the HARQ buffer 129, and then outputs the combined data to the HS-PDSCH_CRC operation, unit 131.

The HS-PDSCH_CRC operation unit 131 performs CRC operation on the HS-PDSCH data acquired from the HARQ processing unit 130. Then the HS-PDSCH_CRC operation unit 131 outputs the error detection result to the scheduling unit 134.

The HS-PDSCH decoding timer 132 controls the transmission timing of the ACK/NACK by monitoring elapsed time from completion of receiving the HS-PDSCH signal. Specifically, the HS-PDSCH decoding timer 132 permits the transmission of the ACK/NAC corresponding to the error detection result output from the HS-PDSCH_CRC operation unit 131 only within a given time period from the completion of receiving the HS-PDSCH signal. On the other hand, when the given time period passes from the completion of receiving the HS-PDSCH signal, the HS-PDSCH decoding timer 132 instructs the scheduling unit 134 to transmit a NACK forcibly. That is, the HS-PDSCH decoding timer 132 controls in such a way that a NACK is transmitted when the decoding processing of the HS-PDSCH is too late for a given response timing. As a case where the decoding processing is too late for the response timing, for example, it may be considered that re-demodulation and re-decoding of the HS-SCCH are performed, and then a decoding unit (block) of the HS-PDSCH data requires much time for the decoding processing.

The PRE/POST determination unit 133 determines the necessity of transmission of the PRE/POST signal based on the error detection result acquired from the HS-SCCH_CRC operation unit 117. Specifically, the PRE/POST determination unit 133 determines that the transmission of the PRE/POST signal is necessary when the error detection result of the HS-SCCH is OK. On the other hand, if the error detection result of the HS-SCCH is NG, the PRE/POST determination unit 133 estimates the error detection result after the re-demodulation and re-decoding based on the acquired fading speed, and then determines the necessity of transmission of the PRE/POST signal according to the estimated result.

If the error detection result of the HS-SCCH is NG, the PRE/POST determination unit 133 estimates that the error detection result after re-demodulation and re-decoding will be OK only if the fading speed is a given threshold value or higher. On the other hand; if the fading speed is lower than the given threshold value, the PRE/POST determination unit 133 estimates that the error detection result after re-demodulation and re-decoding is NG. If the transmission of the PRE/POST signal is determined to be necessary, the PRE/POST determination unit 133 instructs the scheduling unit 134 to transmit a PRE/POST signal. On the other hand, if the transmission of the PRE/POST signal is determined to be unnecessary, the PRE/POST determination unit 133 instructs the scheduling unit 134 to transmit a DTX signal.

According to the transmission timing managed by the transmission timing management unit 128, the scheduling unit 134 sets a transmission schedule of control data such as ACK/NACK/DTX, PRE/POST and CQI added before and after the ACK/NACK/DTX. Then the scheduling unit 134 outputs the control data to the encoding unit 135 based on the scheduling result.

As for the ACK/NACK/DTX and the PRE/POST, the scheduling unit 134 sets a transmission schedule based on the error detection result acquired from the HS-SCCH re-processing unit 119, the error detection result acquired from the HS-PDSCH_CRC operation unit 131, the transmission instruction from the HS-PDSCH decoding timer 132, and the transmission instruction from the PRE/POST determination unit 133. A scheduling method will be described in detail below.

The encoding unit 135 encodes the control data, acquired from the scheduling unit 134, as the data of the HS-DPCCH. Then the encoding unit 135 outputs the acquired HS-DPCCH encoded data to a modulation unit 136.

The modulation unit 136 modulates the HS-DPCCH encoded data acquired from the encoding unit 135. Then the modulation unit 136 outputs the HS-DPCCH signal acquired by modulation to a transmitting unit 137.

The transmitting unit 137 outputs the HS-DPCCH signal acquired from the modulation unit 136 to a transmission antenna (not shown) provided by the mobile station 100. As a result, the HS-DPCCH signal is radio-transmitted to the radio base station 200.

Figure 5:
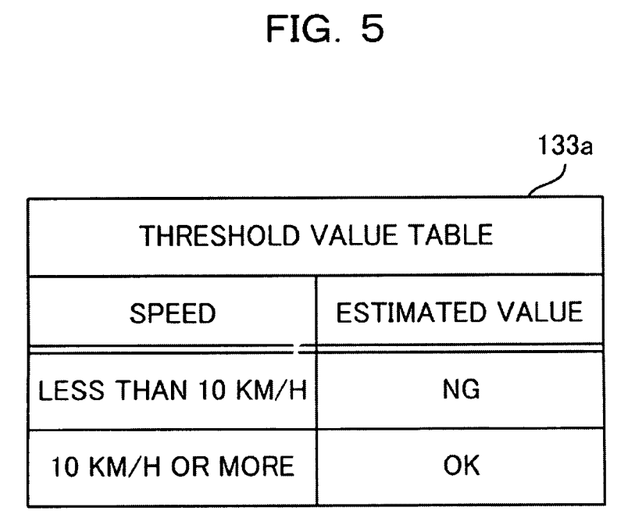
FIG. 5 illustrates a data structure of a threshold value table.

FIG. 5 is a diagram illustrating a data structure of a threshold value table. A threshold value table 133a shown in FIG. 5 is included in the PRE/POST determination unit 133. The threshold value table 133a provides an item indicating speed and an item indicating an estimation value. The information arranged in a transverse direction of each item is corresponded with each other.

A value indicating a range of the fading speed is set to the item indicating speed. The estimation value of the error detection result is set to the item indicating an estimation value. In this case, OK means that it may be estimated that no error is detected. NG means that it may be estimated that error is detected. For example, it is defined that the estimation value is NG when the fading speed is less than 10 km/h, and that the estimation value is OK when the fading speed is 10 km/h or more.

Next, detailed description will be made of processing performed in the mobile station 100 that provides the above-described configuration and data structure. Due to limitations of space, the procedures of the processing performed in the mobile station 100 are divided into FIG. 6 and FIG. 7.

Figure 6:
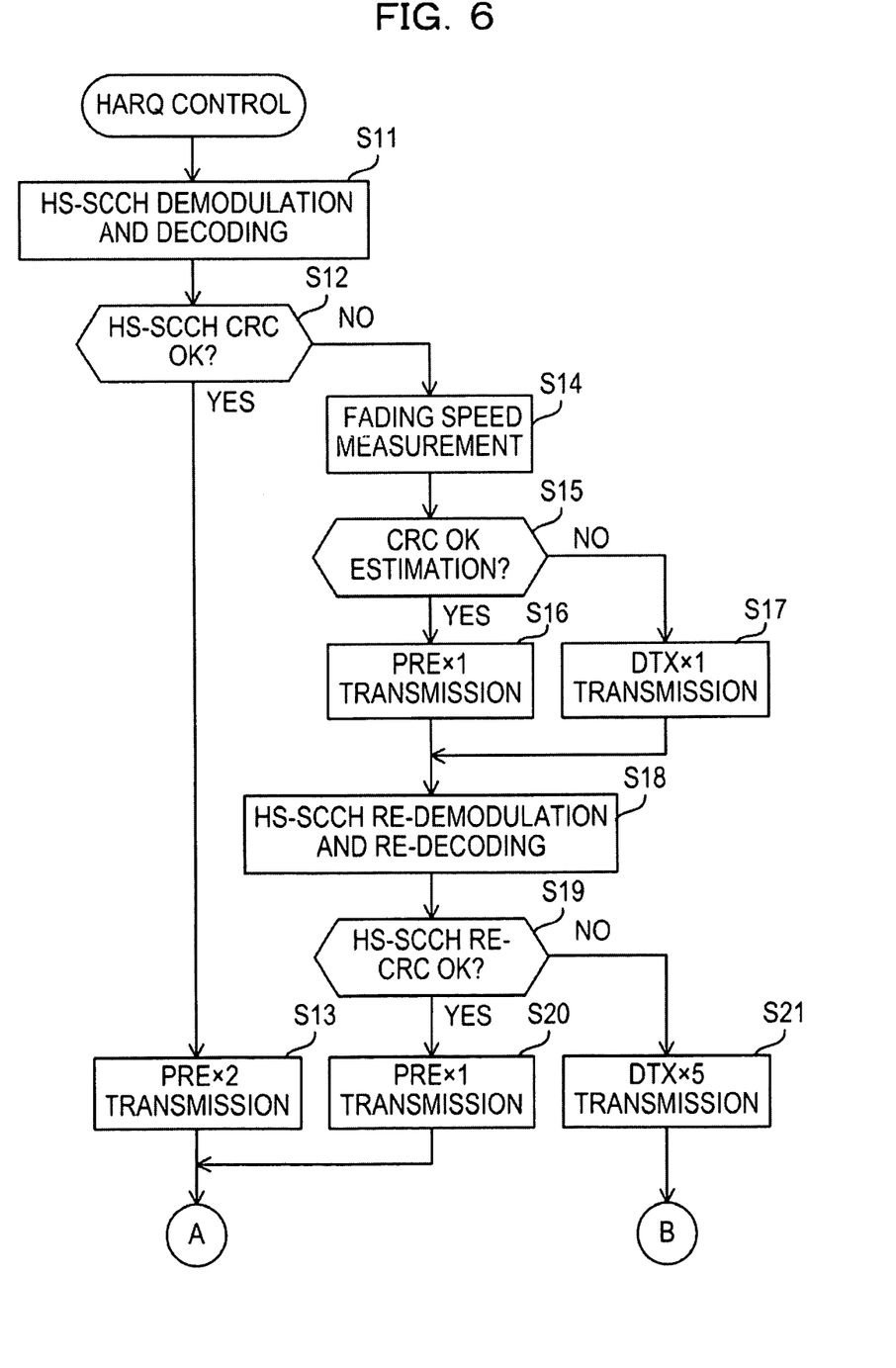
FIG. 6 is a first flowchart illustrating a processing procedure of HARQ control.

FIG. 6 is a first flowchart indicating a processing procedure of HARQ control. Description of the processing shown in FIG. 6 will be described according to step numbers. However, step numbers do not necessary limit the order or timing of performing the described operations.

<Step S11>

The HS-SCCH demodulation unit 115 demodulates the HS-SCCH signal. The HS-SCCH decoding unit 116 decodes the demodulation result of the HS-SCCH signal.

<Step S12>

The HS-SCCH_CRC operation unit 117 performs CRC operation on the decoded HS-SCCH data, and then determines whether or not the error detection result is OK (whether error is included). If the error detection result is OK, the processing proceeds to step S13. If the error detection result is NG, the processing proceeds to step S14.

<Step S13>

The PRE/POST determination unit 133 determines the necessity of transmission of the PRE/POST signal. The scheduling unit 134 performs scheduling in such a way that the PRE signal is transmitted two times by the HS-DPCCH. After that, the processing proceeds to step S22 that will be described below.

<Step S14>

The fading speed measurement unit 126 measures the fading speed (the moving speed of the mobile station 100). The fading speed may be measured, not after the performance of step S12, but in parallel with the processing of step S11 and step S12.

<Step S15>

The PRE/POST determination unit 133 estimates whether or not the error detection result after re-modulation and re-decoding is OK by comparing the fading speed acquired in step S14 to the threshold value table 133a. If the error detection result is estimated to be OK, the processing proceeds to step S16. If the error detection result is estimated to be NG, the processing proceeds to step S17.

<Step S16>

The PRE/POST determination unit 133 determines the necessity of transmission of the PRE/POST signal. The scheduling unit 134 performs scheduling in such a way that the PRE signal is transmitted one time by the HS-DPCCH.

<Step S17>

The PRE/POST determination unit 133 determines that the transmission of the PRE/POST signal is unnecessary. The scheduling unit 134 performs scheduling in such a way that the DTX signal is transmitted one time by the HS-DPCCH.

<Step 18>

The HS-SCCH re-processing unit 119 again demodulates the HS-SCCH signal. Furthermore, the HS-SCCH re-processing unit 119 decodes the demodulation result of the HS-SCCH. The re-demodulation and re-decoding may be performed in parallel with the processing from step S14 to step S17.

<Step S19>

The HS-SCCH re-processing unit 119 performs CRC operation on the decoded HS-SCCH data, and then determines whether the error detection result is OK (whether error is included). If the error detection result is OK, the processing proceeds to step S20. If the error detection result is NG, the processing proceeds to step S21.

<Step S20>

The scheduling unit 134 performs scheduling in such a way that a PRE signal is transmitted one time followed by the transmission signal that is scheduled in step S16 and step S17. After that, the processing proceeds to step S22 that will be described below.

<Step S21>

The scheduling unit 134 performs scheduling in such a way that a DTX signal is transmitted five times followed by the transmission signal that is scheduled in step S16 and step S17. After that, the processing is ended (FIG. 7).

Figure 7:
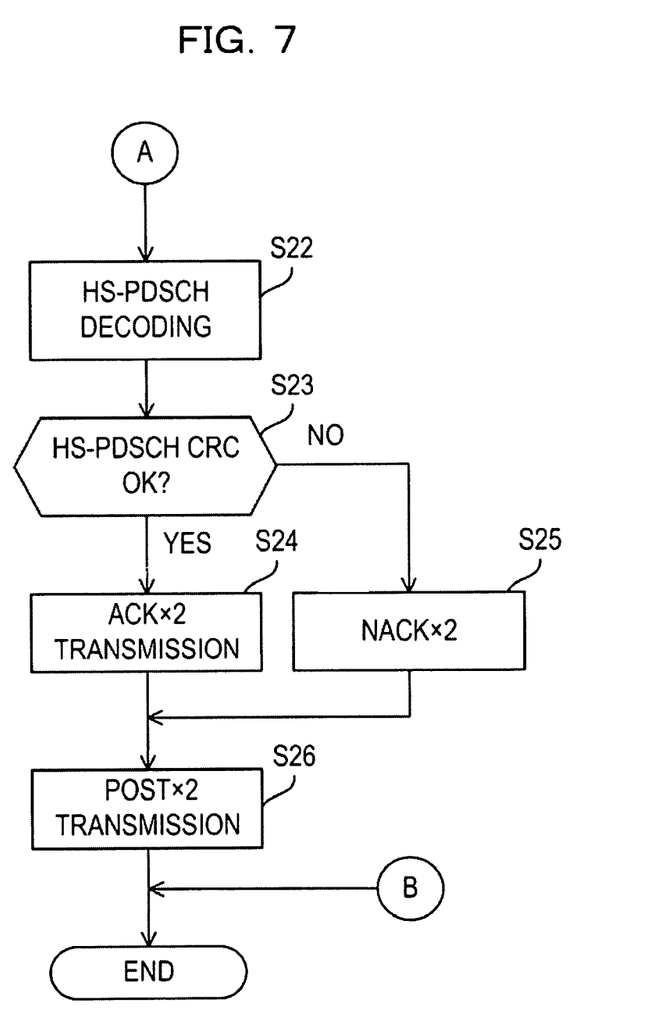
FIG. 7 is a second flowchart illustrating the processing procedure of the HARQ control.

FIG. 7 is a second flowchart illustrating the processing procedure of the HARQ control. As with the description of FIG. 6, the processing shown in FIG. 7 will be described according to step numbers. However, step numbers do not necessary limit the order or timing of performing the described operations.

<Step S22>

The HS-PDSCH decoding unit 124 or the HS-PDSCH re-decoding unit 125 decodes the demodulation result of the HS-PDSCH by using the HS-SCCH data in which the error detection result is OK. When the decoded HS-PDSCH data is retransmitted data, the HARQ processing unit 130 retrieves the data stored in the HARQ buffer 129, and then performs the HARQ composition on the data.

<Step S23>

The HS-PDSCH_CRC operation unit 131 performs CRC operation on the decoded HS-PDSCH data, and then determines whether or not the error detection result is OK (whether error is included). If the error detection result is OK, the processing proceeds to step S24. If the error detection result is NG, the processing proceeds to step S25.

<Step S24>

The scheduling unit 134 performs scheduling in such a way that an ACK signal is transmitted two times followed by the scheduled PRE signal.

<Step S25>

The scheduling unit 134 performs scheduling in such a way that a NACK signal is transmitted two times followed by the scheduled PRE signal.

<Step S26>

The scheduling unit 134 performs scheduling in such a way that a POST signal is transmitted two times followed by the transmission signal that is scheduled in step S24 or step S25.

In this manner, the mobile station 100 determines to transmit a PRE/POST signal when the HS-SCCH data is acquired successfully by the first demodulation and decoding of the HS-SCCH. If the HS-SCCH data is not acquired successfully by the first demodulation and decoding of the HS-SCCH, the mobile station 100 determines to transmit a PRE/POST signal if the mobile station 100 estimates that the HS-SCCH data may be successfully acquired by the second demodulation and decoding of the HS-SCCH.

As a result, the transmission of the PRE/POST signal may be determined at an earlier timing than the case of the determination after waiting for the second demodulation and decoding of the HS-SCCH. Thus, it is possible to prevent the first transmission of the PRE signal from being late because of a time constraint. Furthermore, it is possible to estimate the second demodulation and decoding of the HS-SCCH by the fading speed. This is based on the fact that probability of failure of channel estimation rises if the fading speed is high, and that probability of failure of acquisition of the HS-SCCH data rises.

The above description of the HARQ control processing excludes the case where the NACK is forcibly transmitted by time-out. In the above description of the HARQ control processing, to respond the ACK/NACK, the PRE signal, the ACK/NACK signal, and the POST signal is transmitted two times respectively. However, the respective number of times of transmission may be changed. Accordingly, the number of times of transmission of the DTX signal in the case of responding the DTX may be changed.

Next, description will be made of timing when the mobile station 100 receives the HS-SCCH signal and the HS-PDSCH signal and then transmits the HS-DPCCH signal (ACK/NACK/DTX signal) according to a reception situation.

Figure 8:
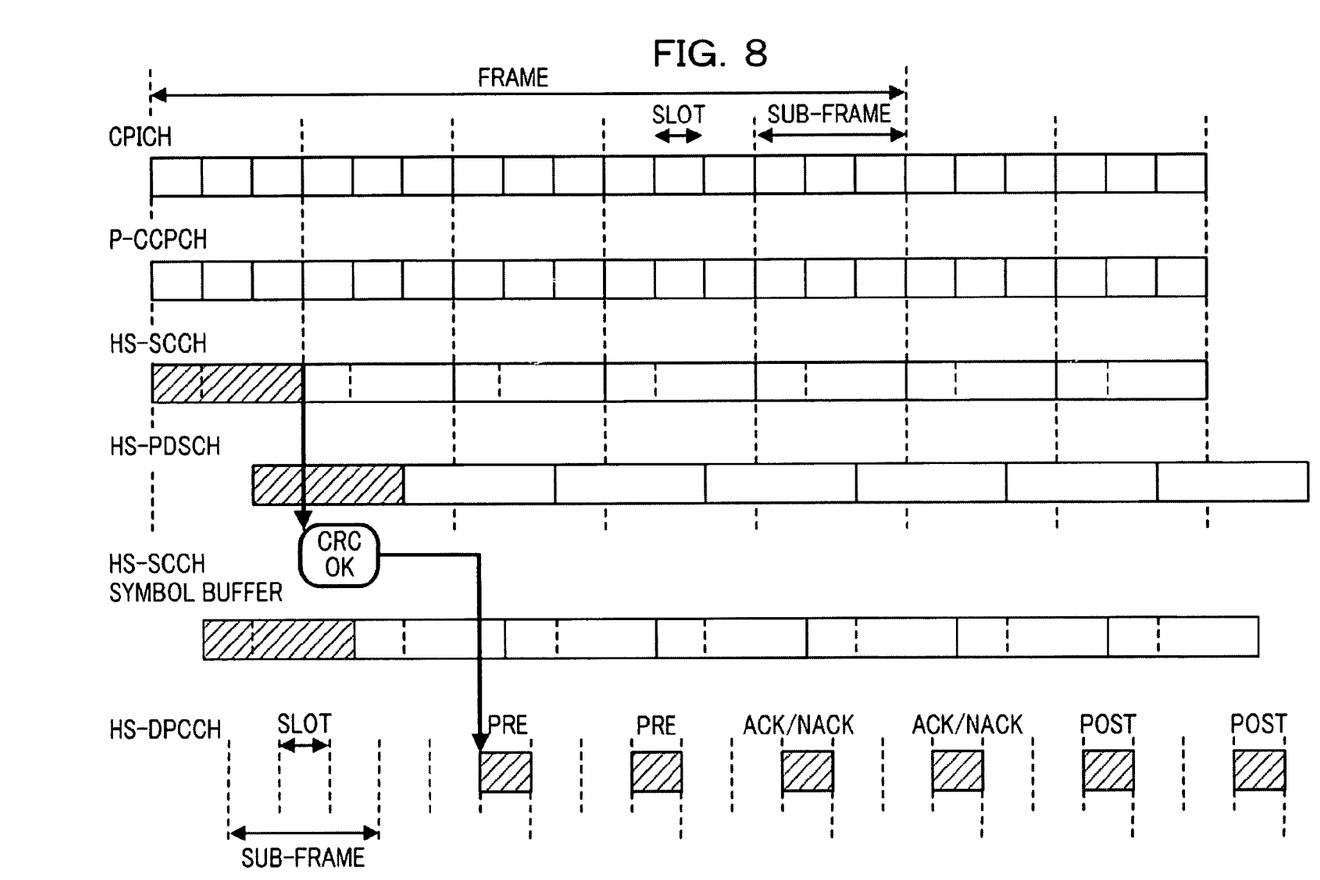
FIG. 8 is a first diagram illustrating timing of a downlink common signal and an uplink common signal.

FIG. 8 is a first diagram illustrating timing of a downlink common signal and an uplink control signal. FIG. 8 illustrates reception of a CPICH signal, reception of an HS-SCCH signal, reception of an HS-PDSCH signal, buffering by the HS-SCCH symbol buffer 113 and timing to transmit an HS-DPCCH signal.

In this case, one frame (10 ms) includes five sub-frames. One sub-frame includes three slots. The head of the frame may be determined based on the CPICH signal. The head of the P-CCPCH and the HS-SCCH corresponds to the head of the frame. On the other hand, the head of the HS-PDSCH is delayed for two slots from the head of the frame. This is because that parameter information such as encoding method acquired by the HS-SCCH and spread code is necessary to perform decoding of the HS-PDSCH.

In the HS-SCCH symbol buffer 113, the HS-SCCH signal for three slots is stored at a reception timing that is delayed for one slot. The HS-SCCH signal has a Part 1 unit with one-slot length that includes an identifier of the mobile station to be addressed and has a Part 2 unit with two-slot length that includes information such as an encoding method.

In the HS-DPCCH, the first ACK/NACK signal needs to be transmitted after 7.5 slots from the completion of receiving the HS-PDSCH signal. To transmit a plurality of ACK/NACK signals, after the first ACK/NACK signal is transmitted, the plurality of ACK/NACK signals are transmitted one time within one sub-frame (three slots). The PRE signal is transmitted one time within one sub-frame before the first ACK/NACK signal. The POST signal is transmitted one time within one sub-frame after the final ACK/NACK signal. The slot that may not be used to transmit the ACK/NACK signal and the PRE/POST signal may be used to transmit a CQI signal.

FIG. 8 illustrates a case of transmitting two of the PRE signals, two of the ACK/NACK signals, and two of the POST signals. When the DTX signal is transmitted instead of the ACK/NACK, the PRE/POST signal is replaced with the DTX signal. That is, in the case of the example of FIG. 8, six of the DTX signals at a maximum are consecutively transmitted. It is preferable that the number of the PRE/POST signals is higher to make the radio base station 200 accurately distinguish and recognize the ACK/NACK and the DTX. To keep a balance between recognition accuracy and the amount of used resources, the number of times the PRE/POST signal is transmitted may be changed according to radio communication quality.

The example of FIG. 8 illustrates the case where the error detection (CRC operation) result becomes OK (no error) by the first demodulation and decoding of the HS-SCCH. That is, if the reception of the HS-SCCH signal is completed after one sub-frame from the head of the frame, error detection is performed on the HS-SCCH data in the subsequent slot. If the error detection result is OK, the HS-PDSCH may be decoded by using the HS-SCCH data. Thus, it is recognized that an ACK signal or a NACK signal is transmitted later. Therefore, it is possible to determine to transmit the PRE/POST signal at this moment.

However, the HS-DPCCH signal may not be transmitted immediately after the transmission determination because of control processing such as scheduling. For example, three slots are necessary until the first PRE signal is transmitted from the transmission determination of the PRE/POST signal. As shown in FIG. 8, when the error detection result is OK and if the transmission of the PRE/POST signal may be determined immediately after the completion of receiving the HS-SCCH signal, it is possible to perform scheduling so as to be in time for the transmission timing of the first PRE signal.

Figure 9:
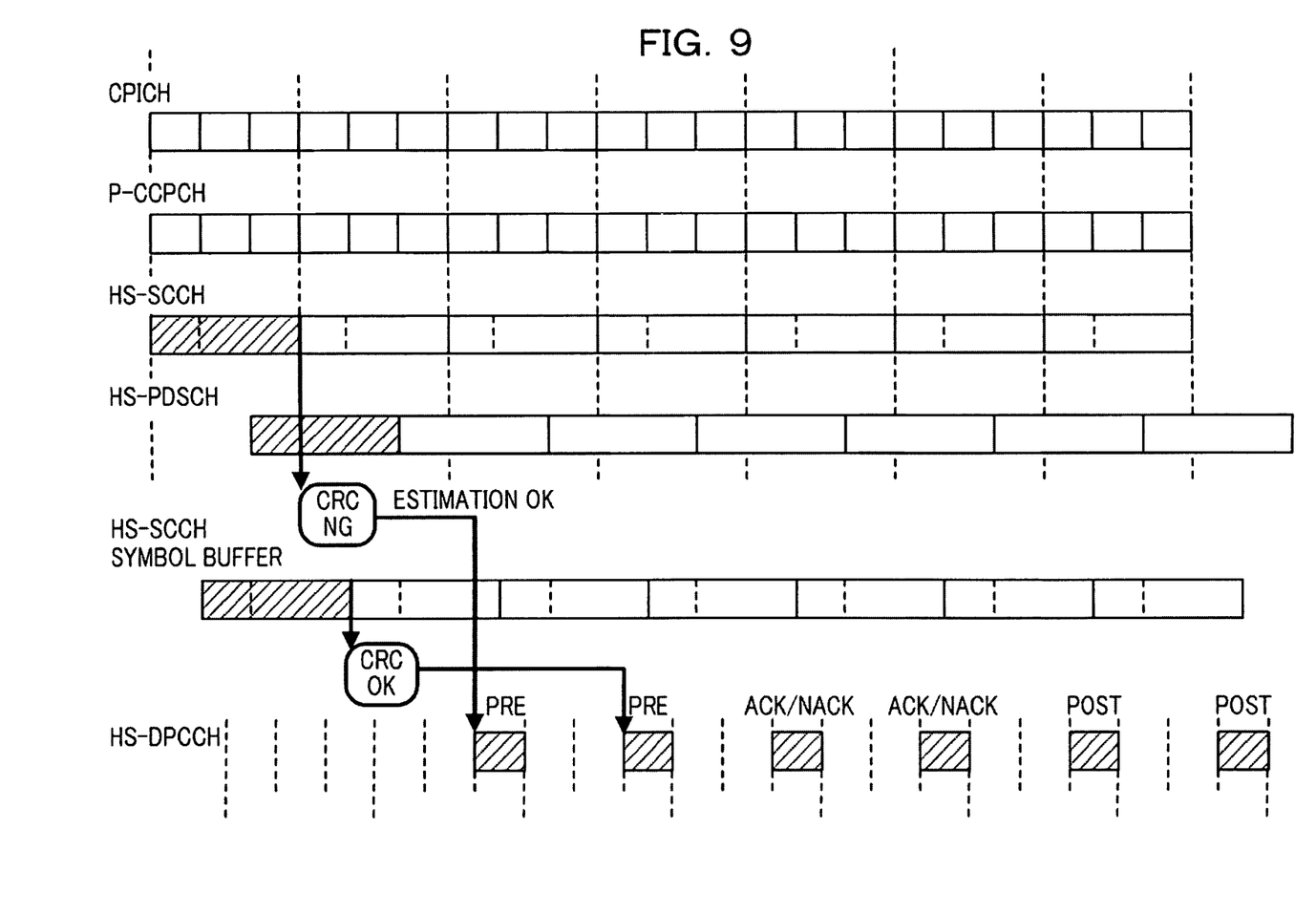
FIG. 9 is a second diagram illustrating the timing of the downlink common signal and the uplink common signal.

FIG. 9 is a second diagram illustrating timing of a downlink common signal and an uplink control signal. The example of FIG. 9 illustrates the case where the error detection result becomes NG (error included) by the first demodulation and decoding of the HS-SCCH and where the error detection result becomes OK by the second demodulation and decoding. That is, the reception of the HS-SCCH signal is completed after one sub-frame from the head of the frame, error detection is performed on the HS-SCCH data by the subsequent slot. If the error detection result is NG, demodulation and decoding are performed by the delay for one slot from the completion of receiving the HS-SCCH signal and by using the HS-SCCH signal stored in the HS-SCCH symbol buffer 113. If the error detection result becomes OK, it is possible to determine to transmit the PRE/POST signal at this moment.

However, it is possible to perform such scheduling based on the error detection result of the second HS-SCCH after the second PRE signal. This is because the scheduling is too late for the first PRE signal since the delay for one slot occurs by the re-demodulation and re-decoding. Therefore, the first PRE signal is determined to be transmitted by predicting the error detection result before the performance of the re-demodulation and re-decoding of the HS-SCCH.

That is, if the error detection result is NG by the first demodulation and decoding of the HS-SCCH, the error detection result after the second demodulation and decoding is predicted based on the fading speed. If the prediction of the error detection result is OK, the scheduling of the first PRE signal is performed without waiting for the actual error detection result. This prevents the first PRE signal from being missed. If the prediction of the error detection result is NG, the scheduling of the DTX signal instead of the PRE signal is performed.

Figure 10:
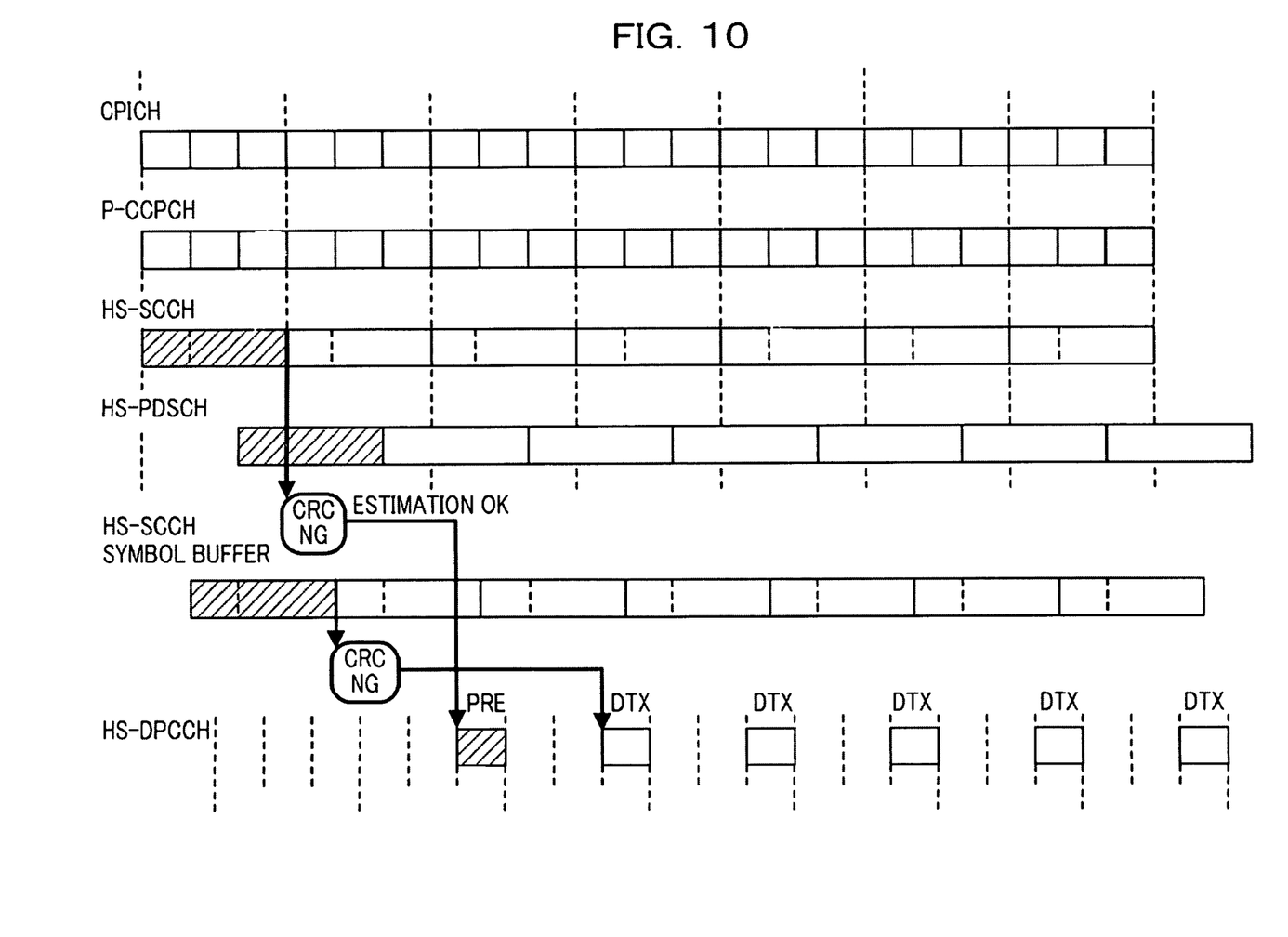
FIG. 10 is a third diagram illustrating the timing of the downlink common signal and the uplink common signal.

FIG. 10 is a third diagram illustrating timing of a downlink signal and an uplink control signal. The example of FIG. 10 illustrates the case where the error detection result is NG by the first demodulation and decoding of the HS-SCCH, and where the error detection result is NG by the second demodulation and decoding of the HS-SCCH. In this case, if the prediction of the error detection result fails, a first HS-DPCCH signal becomes an erroneous signal.

That is, although the error detection result becomes NG by the demodulation and decoding, the PRE signal is transmitted in a case where the DTX signal is supposed to be transmitted as a first HS-DPCCH signal if the error detection result is predicted to be OK. However, for the second signal and succeeding signals, the DTX signal is transmitted in response to the actual error detection result. The radio base station 200 receiving the HS-DPCCH signal is able to actually ignore the single PRE signal described above by determining by the entire PRE/POST signal.

By using such a radio communication system, the mobile station 100 attempts to re-acquire the HS-SCCH data based on the latest channel estimation after the delay of one slot instead of requesting to transmit the DTX signal immediately to request re-transmission when the mobile station 100 may not decode the HS-PDSCH data because of acquisition failure of the HS-SCCH data. Therefore, the number of times of retransmission from the radio base station 200 to the mobile station 100 may be reduced.

At this time, the mobile station 100 estimates the validity/invalidity of re-acquisition based on the fading speed, and then determines the transmission of the PRE/POST signal to be added to the ACK/NACK signal based on the estimated result. Therefore, by the delay for one slot accompanied with the re-acquisition, it is possible to avoid a situation that the first PRE signal may not be transmitted. As a result, it is possible to prevent deterioration in recognition accuracy of the ACK/NACK signal in the radio base station 200.

According to the above-described communication method and communication apparatus, it is possible to perform signal transmission at proper timing with the response information even in the case of re-acquiring the data from the received signal.

The present embodiments describe examples of a mobile communication system in which a mobile station and a radio base station perform radio communication. One skilled in the art may apply the present embodiments to other types of communication system as well. Furthermore, the present embodiments describe examples of a case where the mobile station receives control data from the radio base station, and then transmits the response signal in response to the control data. However, it is also considered that this function of the mobile station side is provided to the radio base station to be applied to uplink communication. Furthermore, it is also considered that the function is applied to transmit a response signal of the case where the mobile station receives data other than the control data. Furthermore, the present embodiments describe examples of a CDMA communication system adopting the HSDPA method. One skilled in the art may apply the present embodiments to other communication methods as well.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

The invention claimed is:

1. A communication method comprising:
   receiving a common channel signal;
   transmitting information indicating a reception state based on data included in the received common channel signal;
   determining whether or not the data included in the received common channel signal is acquirable;
   measuring fading speed based on the received common channel signal in the case where the data is determined not to be acquirable;
   estimating whether or not the data is determined to be acquirable by redetermination based on the measurement result; and
   adding specified signals before and after the information indicating the reception state when the estimating determines that the data is acquirable by re-determination.

2. The communication method according to claim 1, wherein the estimating determines that the data is acquirable when the measurement result indicates that the fading speed is more than a threshold value.

3. The communication method according to claim 1, wherein not subsequently adding the specified signals in the case where the data is determined not to be acquirable by re-determination after estimating that the data is determined to be acquirable by re-determination.

4. The communication method according to claim 1, wherein determining whether or not the data is acquirable based on an acquisition state of control information used to acquire the data.

5. The communication method according to claim 4, wherein determining whether or not the data is acquirable based on an error detection result corresponding to the decoded control information.

6. The communication method according to claim 1, wherein not adding the specified signals to the information indicating the reception state when the measurement result being estimated that the data is determined not to be acquirable is obtained.

7. A communication apparatus comprising:
   a receiver configured to receive a common channel signal;
   a transmitter configured to transmit information indicating a reception state based on data included in the received common channel signal; and
   a processor configured to
   determine whether or not the data included in the received common channel signal is acquirable,
   measure fading speed based on the received common channel signal in the case where the data is determined not to be acquirable,
   estimate whether or not the data is determined to be acquirable by re-determination based on the measurement result, and
   add, in the case where the data is determined to be not acquirable, specified signals before and after the information indicating the reception state based on the fading measurement.

8. The communication apparatus of claim 7, wherein the specified signals are added based on the estimate indicating the data is acquirable by re-determination.

9. A device providing information indicating a reception state based on data included in a received common channel signal, comprising:
   a memory; and
   a processor configured to, by executing a procedure in the memory,
   determine whether or not the data included in the received common channel signal is acquirable,
   measure fading speed based on the received common channel signal in the case where the data is determined not to be acquirable,
   estimate whether or not the data is determined to be acquirable by re-determination based on the measurement result, and
   add, in the case where the data is determined to be not acquirable, add specified signals before and after the information indicating the reception state based on the fading measurement.

10. The device of claim 9, wherein the specified signals are added based on the estimate indicating the data is acquirable by re-determination.

* * * * *